(12) United States Patent
Robert et al.

(10) Patent No.: US 7,676,846 B2
(45) Date of Patent: Mar. 9, 2010

(54) BINDING CONTENT TO AN ENTITY

(75) Inventors: Arnaud Robert, Redmond, WA (US); James M. Alkove, Woodinville, WA (US); Jan M. Hofmeyr, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/778,783

(22) Filed: Feb. 13, 2004

(65) Prior Publication Data

US 2005/0198510 A1  Sep. 8, 2005

(51) Int. Cl.
G06F 7/04 (2006.01)
H04N 7/16 (2006.01)
H04L 9/32 (2006.01)

(52) U.S. Cl. .......................... 726/27; 713/172; 713/175
(58) Field of Classification Search ................ 713/172, 713/789, 175; 726/27
See application file for complete search history.

(56) References Cited

U.S. PATENT DOCUMENTS

| | | | |
|---|---|---|---|
| 5,761,309 A * | 6/1998 | Ohashi et al. ............... 713/156 |
| 6,098,056 A * | 8/2000 | Rusnak et al. ............... 705/75 |
| 6,189,146 B1 * | 2/2001 | Misra et al. ................. 717/177 |
| 6,289,452 B1 | 9/2001 | Arnold et al. ............... 713/175 |
| 6,327,652 B1 | 12/2001 | England et al. |
| 6,330,670 B1 | 12/2001 | England et al. |
| 6,345,256 B1 * | 2/2002 | Milsted et al. ................. 705/1 |
| 6,446,092 B1 * | 9/2002 | Sutter ......................... 707/203 |
| 6,480,959 B1 * | 11/2002 | Granger et al. ............... 713/189 |
| 6,587,837 B1 * | 7/2003 | Spagna et al. ................ 705/26 |
| 6,611,812 B2 * | 8/2003 | Hurtado et al. ............... 705/26 |
| 6,754,661 B1 * | 6/2004 | Hallin et al. ................ 707/100 |
| 6,973,444 B1 * | 12/2005 | Blinn et al. .................... 705/51 |
| 6,983,371 B1 * | 1/2006 | Hurtado et al. ............. 713/189 |
| 6,990,502 B2 * | 1/2006 | Waxman et al. .......... 707/104.1 |
| 7,010,808 B1 * | 3/2006 | Leung et al. .................. 726/26 |
| 7,043,454 B2 * | 5/2006 | Powell ......................... 705/59 |
| 7,047,411 B1 * | 5/2006 | DeMello et al. ............. 713/176 |
| 7,249,197 B1 * | 7/2007 | Roestenburg et al. ....... 709/246 |
| 7,278,165 B2 * | 10/2007 | Molaro ......................... 726/27 |
| 7,318,236 B2 * | 1/2008 | DeMello et al. ............... 726/26 |
| 2001/0042043 A1 * | 11/2001 | Shear et al. .................... 705/51 |
| 2002/0012432 A1 * | 1/2002 | England et al. ............. 380/231 |

(Continued)

FOREIGN PATENT DOCUMENTS

WO    WO 98/42098    9/1998

(Continued)

OTHER PUBLICATIONS

TechEncyclopedia, Digital Certificate, 1981, p. 1-2.*

(Continued)

*Primary Examiner*—Michael Pyzocha
(74) *Attorney, Agent, or Firm*—Workman Nydegger

(57) ABSTRACT

The present invention enforces digital rights within the confines of a content license by validating an entity certificate. Cryptographic information within a entity certificate is utilized to unlock protected content and authenticate the entity certificate. The entity certificate includes personal credentials, which have information that the entity is unwilling or uncomfortable to share publicly. For example, the personal credentials may include private information, or information associated with a personal object that cannot consume the protected content, or both.

12 Claims, 6 Drawing Sheets

U.S. PATENT DOCUMENTS

| | | | |
|---|---|---|---|
| 2002/0013772 A1* | 1/2002 | Peinado | 705/51 |
| 2002/0114466 A1* | 8/2002 | Tanaka et al. | 380/232 |
| 2002/0128972 A1* | 9/2002 | Stefik et al. | 705/52 |
| 2002/0138442 A1* | 9/2002 | Hori et al. | 705/59 |
| 2002/0152387 A1* | 10/2002 | Asano | 713/176 |
| 2003/0005246 A1 | 1/2003 | Peinado | |
| 2003/0007646 A1* | 1/2003 | Hurst et al. | 380/285 |
| 2003/0061144 A1* | 3/2003 | Brickell et al. | 705/37 |
| 2003/0076955 A1* | 4/2003 | Alve et al. | 380/201 |
| 2003/0079133 A1* | 4/2003 | Breiter et al. | 713/182 |
| 2003/0084306 A1* | 5/2003 | Abburi et al. | 713/188 |
| 2003/0088790 A1* | 5/2003 | Kaler et al. | 713/201 |
| 2003/0097655 A1* | 5/2003 | Novak | 725/31 |
| 2003/0120611 A1* | 6/2003 | Yoshino et al. | 705/67 |
| 2003/0156719 A1* | 8/2003 | Cronce | 380/256 |
| 2003/0159033 A1* | 8/2003 | Ishiguro | 713/156 |
| 2003/0165241 A1* | 9/2003 | Fransdonk | 380/258 |
| 2003/0172278 A1* | 9/2003 | Farnham et al. | 713/176 |
| 2003/0187801 A1 | 10/2003 | Chase et al. | |
| 2003/0194092 A1 | 10/2003 | Parks et al. | |
| 2003/0194093 A1* | 10/2003 | Evans et al. | 380/282 |
| 2003/0195855 A1 | 10/2003 | Parks et al. | |
| 2003/0217011 A1* | 11/2003 | Peinado et al. | 705/59 |
| 2003/0217275 A1* | 11/2003 | Bentley et al. | 713/184 |
| 2003/0233561 A1* | 12/2003 | Ganesan et al. | 713/193 |
| 2004/0001594 A1* | 1/2004 | Krishnaswamy et al. | 380/277 |
| 2004/0003251 A1* | 1/2004 | Narin et al. | 713/172 |
| 2004/0003274 A1* | 1/2004 | Strom et al. | 713/193 |
| 2004/0039911 A1* | 2/2004 | Oka et al. | 713/175 |
| 2004/0088541 A1* | 5/2004 | Messerges et al. | 713/156 |
| 2004/0133520 A1* | 7/2004 | Callas et al. | 705/51 |
| 2004/0133775 A1* | 7/2004 | Callas et al. | 713/153 |
| 2004/0158709 A1* | 8/2004 | Narin et al. | 713/156 |
| 2004/0158731 A1* | 8/2004 | Narin et al. | 713/200 |
| 2004/0168061 A1* | 8/2004 | Kostal et al. | 713/170 |
| 2005/0044016 A1* | 2/2005 | Irwin et al. | 705/30 |
| 2005/0138357 A1* | 6/2005 | Swenson et al. | 713/155 |
| 2005/0185792 A1* | 8/2005 | Tokutani et al. | 380/30 |
| 2005/0268115 A1* | 12/2005 | Barde et al. | 713/189 |
| 2006/0085343 A1* | 4/2006 | Lisanke et al. | 705/50 |
| 2006/0095792 A1* | 5/2006 | Hurtado et al. | 713/189 |
| 2007/0005989 A1* | 1/2007 | Conrado et al. | 713/189 |
| 2007/0083766 A1* | 4/2007 | Farnham et al. | 713/176 |

FOREIGN PATENT DOCUMENTS

| | | |
|---|---|---|
| WO | WO 02/01335 | 1/2002 |

OTHER PUBLICATIONS

Ripley, M., et al., "Content Protection in the Digital Home," *Intel Technology Journal*, Interoperable Home Infrastructure, vol. 06, Issue 04, Published Nov. 15, 2002, pp. 49-56.

Gassan Chaddoud, et al., "A Secure SSM Architecture", 10th IEEE International Conference on Networks, Aug. 2002, pp. 343-348.

Deok-Gyu Lee, et al., "The Illegal Copy Protection Using Hidden Agent", EurAsia-ICT 2002, Oct. 29-31, vol. 2510, 2002, pp. 832-841.

Patrick Mannion, "Last Digital-TV Issues Get Resolved as Industry Gears Up for Prime Time", Electronic Design, vol. 48, Issue No. 8, Apr. 17, 2000, pp. 85-97.

Hyeonjeong Mun, et al., "A Digital Content Management Model for Making Profits in Digital Content Sites," Proceedings: 5th International Conference on Asian Digital Libraries, ICADL 2002, Singapore, Dec. 11-14, 2002, pp. 516-517.

Dalit Naor and Moni Naor, "Protecting Cryptographic Keys: The Trace-and-Revoke Approach", IEEE Computer Society, vol. 36, Issue No. 7, Jul. 2003, pp. 47-53.

Brian Smith, "Fort TV", IEEE Spectrum, vol. 40, Issue 5, May 2003, pp. 30-32.

Changsheng Xu and David Dagan Feng, "Web-Based Protection and Secure Distribution for Digital Music", Proceedings: International Conference, Internet and Multimedia Systems and Applications, Honolulu, Hawaii, Aug. 13-16, 2001, pp. 102-107.

Smart Right, Technical White Paper, Version 1.7, Jan. 2003, Thomson, 2003, pp. 1-19.

* cited by examiner

BINDING CONTENT TO AN ENTITY

CROSS-REFERENCE TO RELATED APPLICATIONS

N/A.

BACKGROUND OF THE INVENTION

1. The Field of the Invention

The present invention generally relates to digital rights management. More specifically, the present invention provides for protecting content within a digital rights management system for an entity.

2. Background and Related Art

Digital rights management (DRM) has become highly desirable among content owners, due in part to concerns over the distribution of copyrighted digital content (such as digital audio, digital video, digital text, digital data, digital multimedia, etc.) to users for consumption. Typical modes of distribution of such content include tangible devices such as magnetic (floppy) disk, magnetic tape, optical (compact) disc, DVD, etc. and intangible media such as electronic bulletin boards, electronic networks, the Internet, etc. Upon being received by the user, such users consume the content by rendering, playing or otherwise interacting with the digital content with the aid of an appropriate rendering device such as a media player, personal computer, or the like.

Typically, a content provider, or rights owner, such as an author, publisher, broadcaster, etc. (hereinafter "content owner"), wishes to distribute such digital content to a user or a recipient in exchange for a license fee or some other consideration. Usually, however, content owners wish to restrict what the user can do with such distributed digital content. For example, the content owner may wish to restrict the user from copying and re-distributing such content to a second unauthorized user. Accordingly, content owners have used DRM to bind content to a specific device or limited group of devices.

FIG. 1 illustrates an example of a DRM system 100, which allows a content owner to bind content to a specific device or limited group of devices. In general, the licensing process is initiated by the content owner encrypting content and packaging and distributing the content to consumers via the Internet, CD, or other conventional means. Consumers may then receive a license for consuming the content in accordance with the business rules defined by the content owner. As noted above, traditionally these rules have required that the content be bound to a specific device or limited group of devices. The following describes how a license may be used to bind content to a specific device or limited group of devices in accordance with a typical DRM model.

A content owner usually encrypts and packages the content in accordance with any number of well-known processes. Typically, however, the content will be packaged to include the encrypted content and a header portion that includes information to assist a device in consuming the content. Further, the packaged content may use a license acquisition URL to point to a location where a license may be acquired. Moreover, there is a number of other optional and important data which may be included within the packaged file, e.g., private signing key used to sign the content header, license key seed used to generate the key that is shared between the content owner and license issuer, etc.

The content 105 may be sent to a content distributor 140 and placed on a web or file server or streaming server for distribution. Consumer device 130 receiving the content may then be directed to the license acquisition URL that is embedded within the header (or other areas) of the file to acquire the appropriate license 125 for consuming content 105. Before license 125 can be requested and distributed by license issuer 115, the content owner sends to the license issuer 115 the business rules and sharing of secrets 110, which typically include the seed, public key and the business rules by which a license 125 will be granted. The rules 110 define how and under what conditions licenses may be distributed to users or consumer devices 130. For example, the rules may allow for the distribution of digital content to be played only a limited number of times, only for a certain total time, only on a certain type of machine, only on a certain type of media player, only by a certain type of user, only by a certain group of devices, etc. In any event, the license issuer 115 should be trusted in order to ensure that licenses 125 are issued in accordance with the appropriate business rules or requirements 110 as specified by the content owner.

Device 130 may obtain the content 105 from the content distributor 140 after paying such consideration 135 as defined by the content owner. As previously mentioned, in order to play the encrypted content 105 the consumer device 130 must first obtain a license 125 from the license issuer 115. A license request 120 is to the license issuer 115, which may include exchanging the content identification, information about the client computer 130 and other optional information. Based on the information received, the license issuer 115 responds with an appropriate license 125, thereby allowing the device 130 to consume the encrypted content 105.

FIG. 2 illustrates an implementation of how content 210 may be bound to the device 205 through the use of a license 215 that binds a certificate 220 to the content 210. The license 215 will typically include the encryption key (KC) to decrypt the content, the specified usage rights, information about the device 205, e.g., a device identity (D_ID), and other information. As previously mentioned, in order to tightly control the consumption of the content 210 the license is bound to a particular device or client computer 205 through the use of a certificate 220 that has the same D_ID and information specific to device 205. Similarly, content 210, encrypted with KC, includes a key identity (K_ID), which binds the content to the license that has the same K_ID. In other words, traditionally the license was valid only for device 205 and content 210, and therefore the content usually could only be consumed by the specific device 205.

With competing interests of consumers, which desire the ability to consume content on any number of devices (e.g., a desktop computer, a laptop computer, a hand-held device, devices within a car or home audio/visual system/network), various mechanisms have been created to extend licenses for consuming content to a set of devices that share both content and license. Sharing the same content and license on any of several devices more closely approximates the user's experience for tangible media, such as a CD, which may be played on any of several devices or even loaned to another.

FIG. 3 illustrates one example of how content and a license may be distributed within a domain or network 300 that includes multiple devices. Initially, device 305 requests and obtains content 310 and license 320 in accordance with a procedure similar to the one described above with regard to FIG. 1. Content 310 is encrypted and bound to a content license 320 through a key identifier (K_ID) that is specific to content 310. Rather than binding the license to a particular device, however, license 320 includes a device ecosystem or network identifier (N_ID), which binds the license to those devices that have the same N_ID. The necessary tools are also provided to generate and manage the unique network identifier N_ID, such that the content 310, license 320 and N_ID may be distributed throughout the network 300. For example, in the case of link encryption, such a system defines a framework in which devices can authenticate one another and content can flow provided the authentication was successful. As such, network device 330 may authenticate and link to device 305 in order to obtain the content 310, license 320 and N_ID for consuming the content. Similarly, device 335 may obtain license 320 in content 310 from device 330, and subsequently consume the content in accordance with the business rules defined within license 320 provided device 335 has also obtained the appropriate N_ID or certificate containing such.

Although a domain or network distribution of protected content expands the number of devices for which content can be consumed—due to concerns over wide distribution of the content to unauthorized users—the content provider or owner will typically restrict the domain to a limited number of devices or allow consumption of the protected content for a limited duration of time. As mentioned above, however, consumers have a competing interest of consuming content on any device they wish. As such, there exits a need to establish a fair compromise between these competing interests.

BRIEF SUMMARY OF THE INVENTION

In accordance with exemplary embodiments of the present invention, the above-identified deficiencies and drawbacks of current digital rights management system (DRMs) are overcome. For example, the present invention provides a rights management system that protects content from being consumed by unauthorized devices. In particular, the present invention provides for methods, systems and computer program products for enforcing digital rights within the confines of a content license by validating an entity certificate that includes personal credential information that an entity would be unwilling or uncomfortable to share publicly.

Example embodiments provide that the protected content can be received that is bound to a content license that includes one or more usage rights that define how and under what conditions the protected content can be consumed on a device. Further, the content license includes a content encryption key used to unlock and consume the protected content. Moreover, an entity certificate can be received that includes personal credentials, which the entity is unwilling or uncomfortable to share publicly. The personal credentials comprising private information, or information associated with a personal object that cannot consume the protected content, or both. Cryptographic information within the entity certificate is utilized for unlocking the content, thereby validating the entity certificate and allowing the device access to the protected content for consumption.

Other example embodiments provide for enforcing digital rights within the confines of a content license by checking credentials in a hierarchical fashion. Again, the protected content is received that is bound to a content license. Further, the content license is received that provides one or more content encryption keys used to unlock and consume the protected content. The content license further including one or more usage rights that define how and under what conditions the protected content can be consumed on one or more devices.

Example embodiments provide for determining if an entity certificate exists that includes information about personal credentials, which the entity is unwilling to share publicly. The personal credentials may comprise private information, or information associated with the personal object that cannot consume the protected content, or both. If an entity certificate exists, cryptographic information within the entity certificate may be utilized for unlocking the content and allowing the device access to the content for consumption.

If an entity certificate does not exist or cannot be validated, a determination for if a domain certificate exists is performed. The domain certificate includes domain credentials for a group of devices. If a domain certificate exists, cryptographic information within the domain certificate may be utilized for unlocking the content and allowing the device access to the content for consumption.

If a domain certificate does not exist or cannot be validated, it is next determined if a device certificate exists that includes device credentials for the specific device. If a device certificate exists, cryptographic information within the device certificate may be utilized for unlocking the content and allowing the device access to the content for consumption.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for enforcing digital rights by validating an entity certificate that includes personal credential information that the entity would be unwilling or uncomfortable to share publicly. The embodiments of the present invention may comprise a special purpose or general-purpose computer including various computer hardware, as discussed in greater detail below.

As mentioned above, content providers use digital rights management (DRM) systems to ensure some level of security that content will not be widely distributed to unauthorized users. Accordingly, content has traditionally been restricted or bound to a device or limited group of devices. Consumers, however, desire the ability to consume content on any number of devices (e.g., a desktop computer, a laptop computer, a hand-held device, devices within a car or home audio/visual system/network, etc.). Due to these two competing interests between consumers and content providers, the present invention provides for binding digital content to an entity rather than a device or group of devices. For example, the present invention enforces digital rights within the confines of a content license by validating an entity certificate that includes personal credential information that an entity would be unwilling or uncomfortable to share publicly. It is noted that for purposes of this invention, an entity is broadly defined as, e.g., a person, a group of persons, a corporation, and the like.

Figure 1:
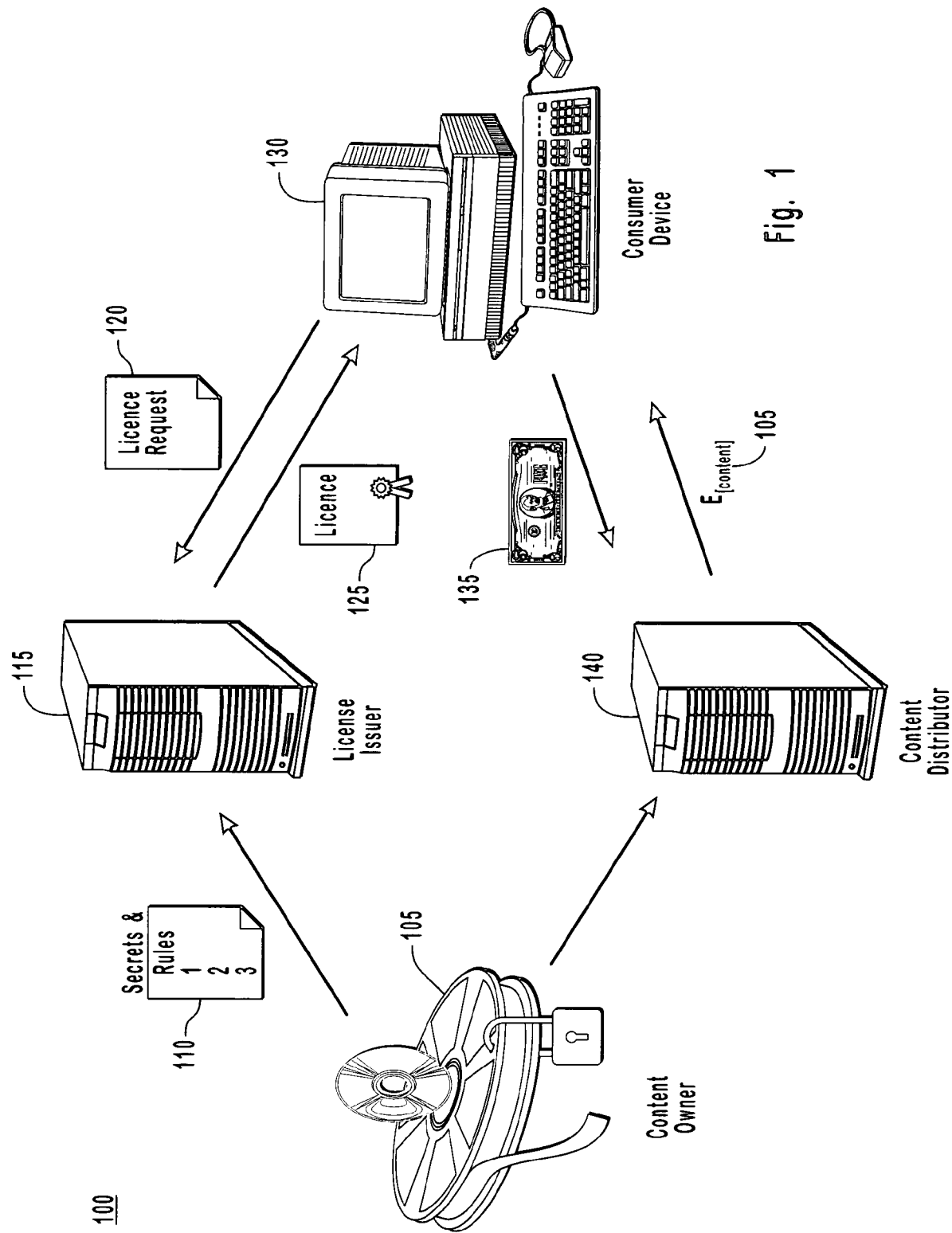
FIG. 1 illustrates an example of a typical digital rights management system that binds content to a device or group of device through the distribution of a content license.
Figure 2:
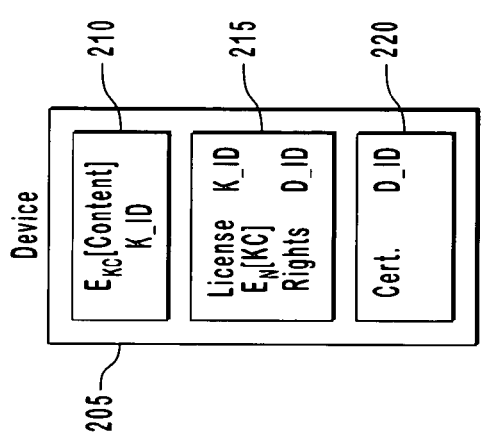
FIG. 2 illustrates an example of how content and a certificate that is device specific is bound to a license within a device.
Figure 3:
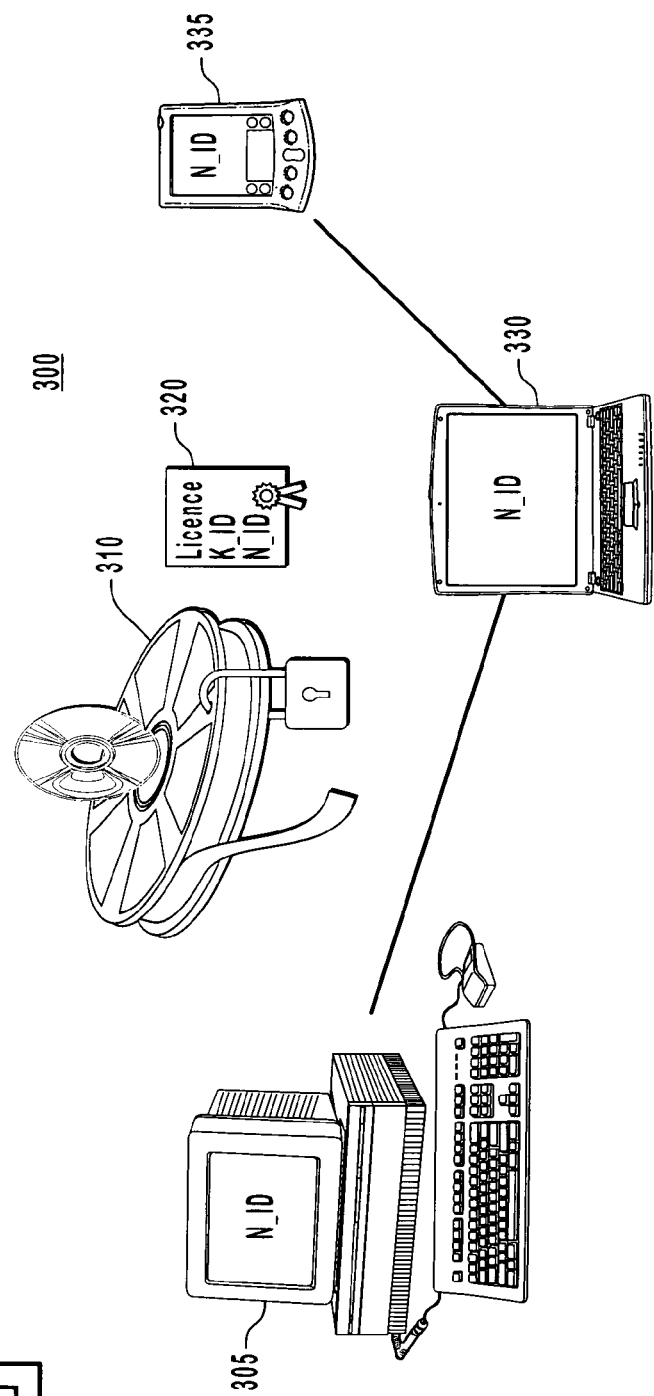
FIG. 3 illustrates an example of a typical distribution of protected content and a corresponding license within a domain or network.
Figure 4:
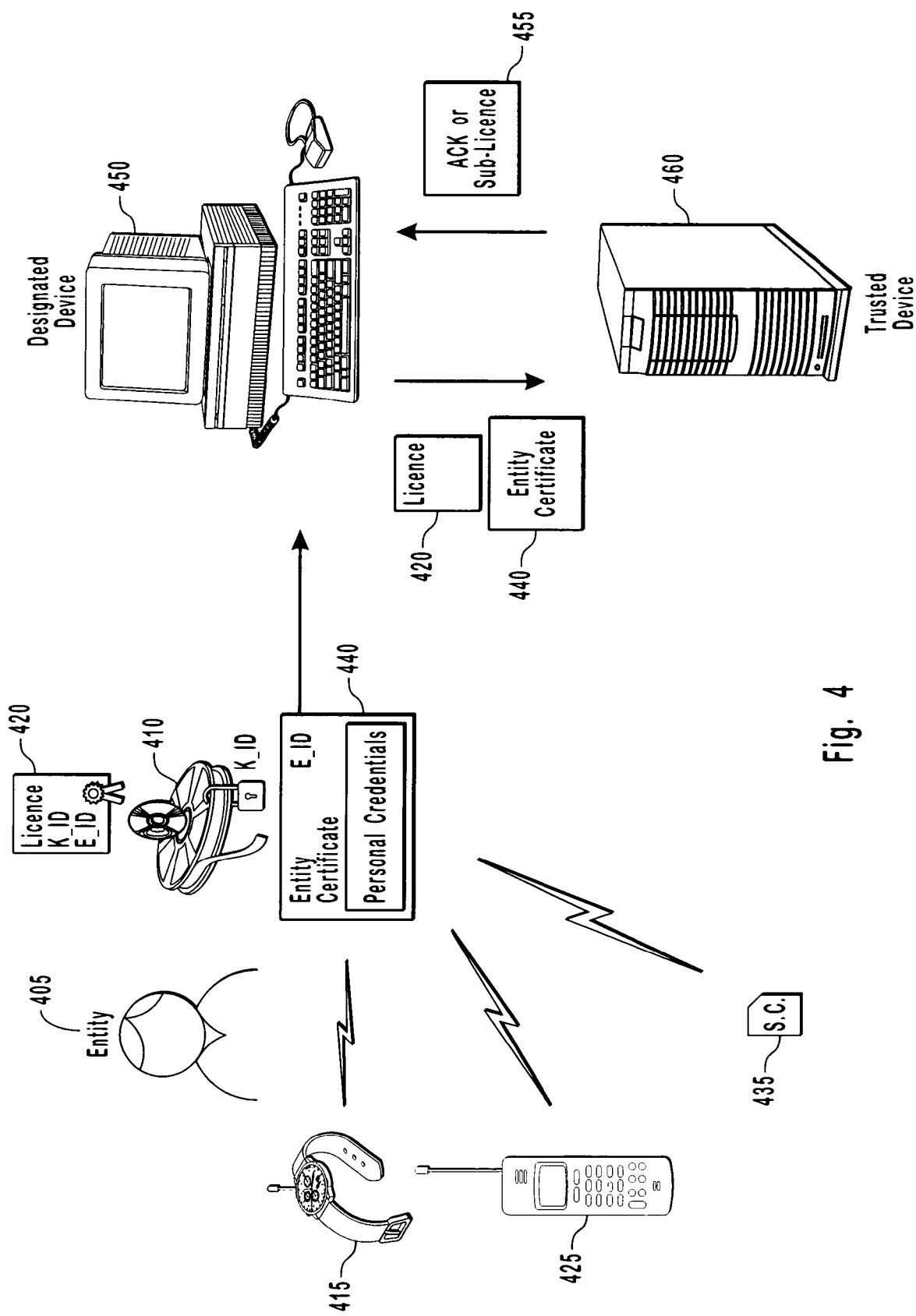
FIG. 4 illustrates an example embodiment of how protected content and licenses may be distributed and validated for an entity.

FIG. 4 illustrates an example embodiment for how protected content and licenses may be distributed and validated for an entity. An entity 405 is shown, which receives protected content 410, a content license 420 and an entity certificate 440 by a similar process as previously described with traditional DRM systems. The entity 405 is represented in the digital world by the entity certificate 440, which contains an ensemble of credentials related to the entity 405 and used by a third-party service to securely identify the entity 405. Example embodiments provide that the various credentials may include, but are not limited to, the following: (1) the identity of a trusted authority that generates the entity certificate 440 (not shown); (2) a date for which the certificate was generated or granted; (3) cryptographic information, e.g., a private/public key pair, a symmetric key, shared secret, etc.; (4) and/or information on the entity 405 including personal credentials.

The personal credentials within the entity certificate 440 include private information and/or information associated with a personal object that cannot consume the protected content, which the entity is unwilling or uncomfortable to share publicly. As discussed in greater detail below, the private information may include one or more of a social security number, tax identification number, passport number, enterprise registration number, driver's license number, an electronic serial number, digital signature, or any other information associated with the entity that generally is preferred to be kept as private information. Further, information associated with a personal object that cannot consume the protected content may include a watch, mobile or wireless device (e.g., cell phone, infrared device, radio frequency device, etc.), a smart card, a remote that controls the usage of the content, or other object that is unlikely to be lent to another. Other example embodiments provide that each of the various credentials described above can be transmitted or distributed in the clear, encrypted using entity credentials or encrypted using a trusted authority credentials.

Any of a number of existing certificate management mechanisms can be used to obtain the entity certificate 440. For example, the entity 405 may send a request to a trusted authority (not shown) to obtain a certificate. Some form of handshake, or trust validation, between the entity and trusted authority may then occur in order to generate a public/private key pair, which, as mentioned above, may be included as part of the credentials within the entity certificate 440. Example embodiments provide that the certificate can be stored in the clear, encrypted using entity credentials (e.g., a password, a code, a pin, etc.), or encrypted using credentials of the trusted authority.

As shown in FIG. 4, content 410 is bound to the license 420 through a key identifier (K_ID), and the license 420 is bound to entity certificate 440 through an entity identifier (E_ID). Further, as previously mentioned, the entity certificate 440 is a digital representation of entity 405, thereby ultimately binding content 410 to entity 405.

The license 420, content 410, and the entity certificate 440 may be distributed either directly or indirectly to a device 450 designated by the entity, which will be used to consume protected content 410. For example, license 420 and protected content 410 may be distributed to the designated device 450 through any conventional means previously described above in the DRM process. Alternatively, the license 420 and protected content 410 may be supplied to the designated device 450 by entity 405 via, e.g., a CD, DVD, magnetic file, audio/video stream, etc. It should be noted that the device could also be designated by someone or something other than the entity. For example, a trusted device, as described in greater detail below, may designate the appropriate device to consume the content. Accordingly, the usage of the term designated device is for illustrative purposes only, and is not meant to otherwise limit the scope of the invention.

Similarly to the distribution of the license 420 and protected content 410, the entity certificate 440 may be distributed to the designated device 450 through any number of ways. For example, entity certificate 440 could be distributed to the designated device 450 by an entity authority (not shown) that generated the entity certificate 440. Alternatively, the entity 405 may provide the entity certificate 440 to the designated device 450 through any one of various means. For example, entity 405 could distribute the entity certificate 440 to the designated device 450 through a personal object that is not capable of consuming the protected content 410. For example, a smart card 435 could be used to store and distribute the entity certificate to the designated device 450 by any one of many well known processes.

Smart cards are currently used in many different fields and applications to store cryptographic information, e.g., private keys, symmetrical keys, private/public key pairs, and other sensitive or secret information. Accordingly, a smart card is an attractive alternative for storing and distributing the entity certificate 440 to the designated device 450. Of course, there could be natural variance of the current smart cart where the actual chip is utilized in a different form, similar to GSM (Global System for Mobile communications) that use SIM (Subscriber Identity Module) cards. This would allow a smart card chip, or similar type chip, to be embedded in any number of personal devices, e.g., cellular phones, watches, car alarm keys, or any other number of mobile objects to which an entity 405 would be unwilling, reluctant and/or uncomfortable to share publicly.

There are many advantages for using a cellular phone 425 or other mobile or wireless device (e.g., a personal digital assistance (PDA), infrared device, radio frequency device, etc.) for distribution of the entity certificate 440. For example, the cellular phone 425 inherently has wireless connectivity, and therefore could easily communicate with any other wireless device that can use data to authenticate the entity. Further, most next generation cellular phones include security systems that would allow the management and storage of the entity certificate 440, e.g., SIM cards. Moreover, most cellular phones have navigation capabilities that could be used to control the designated or consumption device 450, and there are already examples of applications that allow one to control a device with the use of the cellular phone. For at least those reasons stated above, it is clear that the cellular phone 425, which is an example of a personal object that an entity 405 would be unwilling, reluctant and/or uncomfortable to share publicly, may be used to distribute the entity certificate 440 to a designated device 450 used for consuming protected content 410.

As mentioned above, there are also many other personal objects that may be used to distribute the entity certificate 440 to the designated device 450. For example, watch 415 may have a security chip and a wireless communication capability to distribute entity certificate 440 to designated device 450. Accordingly, watch 415 could also act as a proxy to store and manage the entity certificate 440 through a secured chip and the wireless communication. Watch 415, as with cellular phone 425, smart card 435, or any other personal object, could also make use of contactless technologies as an alternative to the wireless communication procedure (e.g., infrared technology as used by a remote control that controls content usage on one or more media or designated devices 450). Such technologies enable information transfer between a source chip (e.g., embedded in the watch 415) and a receiver (the designated device 450 in this case), provided that the two elements are within a given proximity—as set forth by characteristics of the system.

Of course, any of the aforementioned means used to distributed entity certificate 440 to designated device 450 may also use any wire or other connection means to distribute entity certificate 440 to the designated device 450. Accordingly, the aforementioned mechanisms for distributing entity certificate 440 to the designated device 450 by any of the personal objects are used as illustrative purposes only and are not meant to limit or otherwise narrow the scope of the invention.

Regardless of how the designated device 450 receives entity certificate 440 and content license 420, designated device 450 (or some other trusted device 460 as described hereinafter) can utilize cryptographic information within the entity certificate 440 for authenticating or validating the entity certificate and allowing the designated device access to the protected contact. For example, as previously mentioned, content license 420 may include one or more content encryption keys for unlocking and consuming the protected content. Cryptographic information (e.g., private/public key pair, symmetric key, or other similar credentials or shared secret) within the entity certificate can be used for decrypting and accessing the content encryption keys within license 420. If the cryptographic information is valid, the entity certificate will decrypt the content encryption keys, thereby allowing the device to unlock and consume the protected content.

Other example embodiments provide other ways to validate or authenticate the entity. For example, designated device 450 (or some other trusted device 460) may compare personal credentials within the entity certificate 440 with personal credential information within the license for validating the entity certificate. As previously mentioned, the personal credentials within the entity certificate 440 should be information that the entity is unwilling or uncomfortable to share publicly such as private information (e.g., social security number, tax identification number, passport number, enterprise registration number, driver's license number, credit card number, login password, etc.) or information associated with a personal object that cannot consume the protected content (e.g., information about a smart card 435, cellular telephone 425, watch 415, that may include an electronic serial number, digital signature, or any other similar information).

Other example embodiments allow a designated device that does not inherently have the ability to authenticate or validate the entity certificate 440, to validate or use the entity certificate 440 through the use of an entity proxy or other trusted device 460. For example, a trusted device 460 may receive license 420 and entity certificate 440 from the designated device 450. Trusted device 460 may then utilize cryptographic information within the entity certificate 440 for authenticating the entity certificate and unlocking the content encryption key(s) within the license 420. Alternatively, or in conjunction, the trusted device 460 may compare personal credentials within the entity certificate 440 with personal credential information within the license 420 for validating the entity certificate. In the case of a successful authentication, trusted device 460 may return an acknowledgement message (ACK) 455 to the designated device 450, which can then allow usage of the protected content 410 in accordance with the business rules defined within license 420.

Alternatively, trusted device 460 may be a device on which entity 405 logs on, even though the content will be used by the designated device 450. In such a case, trusted device 460 validates the entity certificate 440 and sends an ACK 455 to the designated device 450, thereby allowing the designated device access to encryption key(s) within license 420 for unlocking and consuming the protected content 410. Of course, trusted device 460 may receive the license 420 and entity certificate 440 from a content distributor (not shown), content owner (not shown), license issuer (not shown), or any other trusted source.

In yet another example embodiment, trusted device 460 not only authenticates the entity 405 through the validation of the entity certificate 440, but also controls the media usage commands and sends them to the designated device 450. For example, trusted device 460 could be a remote control that not only controls consumption commands for the protected content or media, but also can authenticate or validate the entity certificate. Further, as described in greater detail below, trusted device 460 or other entity proxy could allow devices that do not have the notion of an entity or have no mechanisms to authenticate the entity against a given license, to consume content (provided this operation is granted by the content license). For example, one implementation of the entity proxy 460 is to generate a sub-license 455 for the designated device 450, using the designated device 450 identity as the authentication mechanism. This example embodiment suggests the notion of license hierarchy, as described hereinafter.

Figure 5:
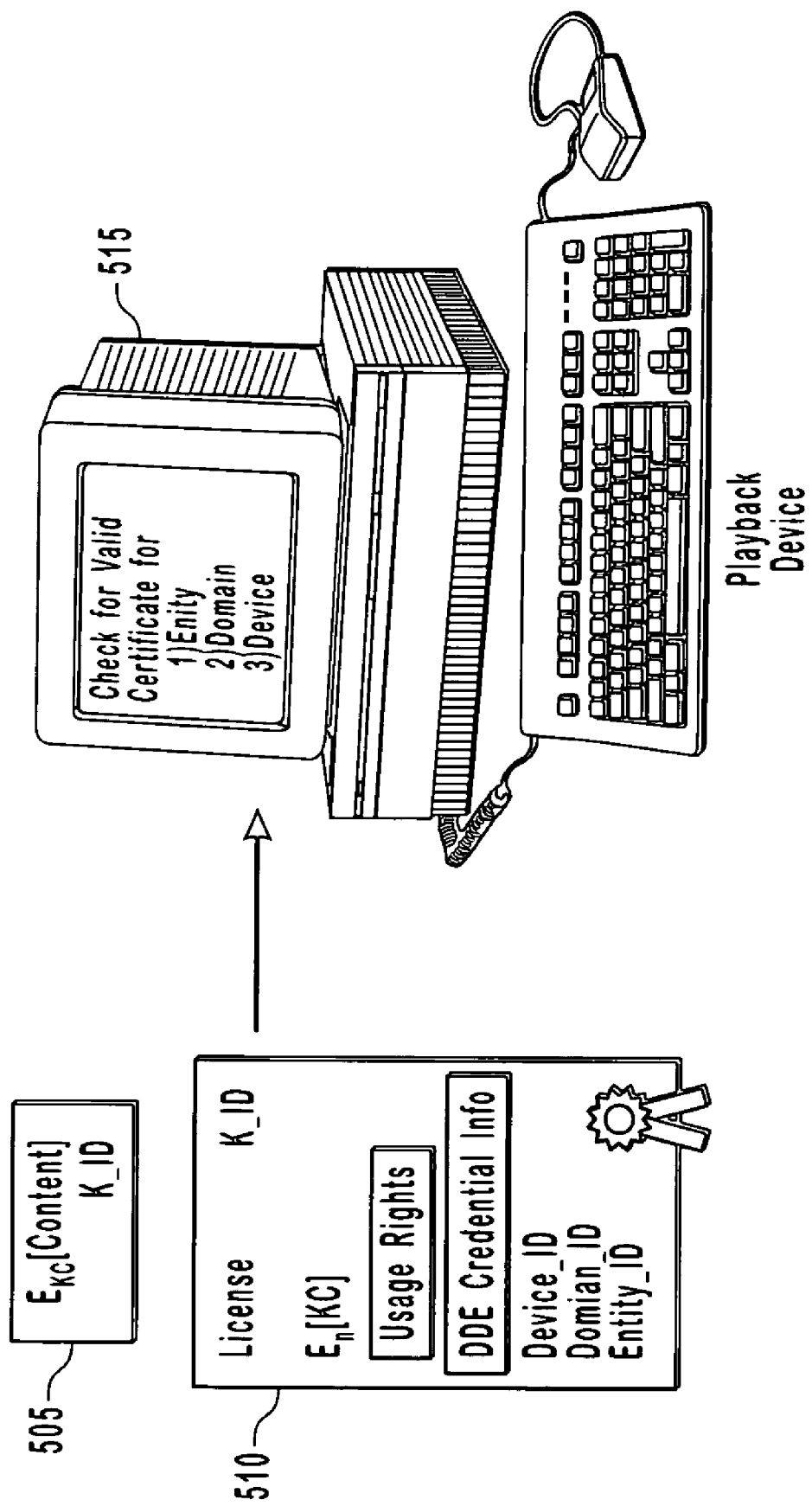
FIG. 5 illustrates an example embodiment of how a device that plays back encrypted content can use a content license to check credentials in a hierarchical fashion.

FIG. 5 illustrates an example implementation of how a device that plays back encrypted content can use a content license to check credentials for a device, domain and entity in a hierarchical fashion. As shown, encrypted content 505 is bound to a license through a K_ID within license 510. License 510, will typically include, the encryption content key (KC) the usage rights as defined by the content provider and credential information for a device, domain and entity (DDE). In addition, the license could include a device identifier, a domain identifier and an entity identifier. As such, the license 510 is bound to one specific device as defined by the device identity, a group of devices that is defined by the domain identity, and an entity as defined by the entity identifier. A playback device 515, or equivalent proxy device as previously mentioned, will then check for a valid certificate in hierarchical fashion by checking first the entity, then the domain, and finally a device.

One way to look at how a license hierarchy can be implemented is through the following explanation. The content provider may choose to increase the flexibility of usage of his content by licensing to a device, then a domain and ultimately an entity. Accordingly, when the license is challenged for usage, the challenge starts at the highest possible flexibility, which is the entity. If there is no such notion of entity, then the domain is challenged, then the device. In other words, playback device 515, or a proxy, will first check if a certificate contains an entity identifier, then a domain identifier, and finally a device identifier. Within any one of these hierarchical notions, playback device 515 will validate the certificate. Upon authentication of the certificate, playback device 515 is allowed access to the content keys within the license 510 for decrypting protected content 505 in accordance with the usage rights defined within the content license.

Other example embodiments provide for revoking a license for a specific device, a group of devices, an entity or a group of entities. For example, the license and/or certificate for a device, domain or entity may have a time stamp or usage stamp. In such instances, upon the expiration of a time period or a number of times the protected content or entity certificate is used the certificate or license is considered invalid and must be reacquired through an appropriate method as that described above. Of course, any other well known revocation methods should be available, and the above revocation method is meant as an example and should not be interpreted to narrow the scope of the present invention. Because of the license hierarchy previously described, if the entity certificate is revoked, the content may still be consumed if a valid domain or device certificate exists. Other embodiments also provide a renewal process, wherein a request is automatically made to an authority that generated the entity certificate just before, or prior to, the revocation.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving particular results. Although the functional steps and non-functional acts may be described or claimed in any particular order, the present invention is not necessarily limited to any particular ordering or combination of acts and/or steps.

Figure 6:
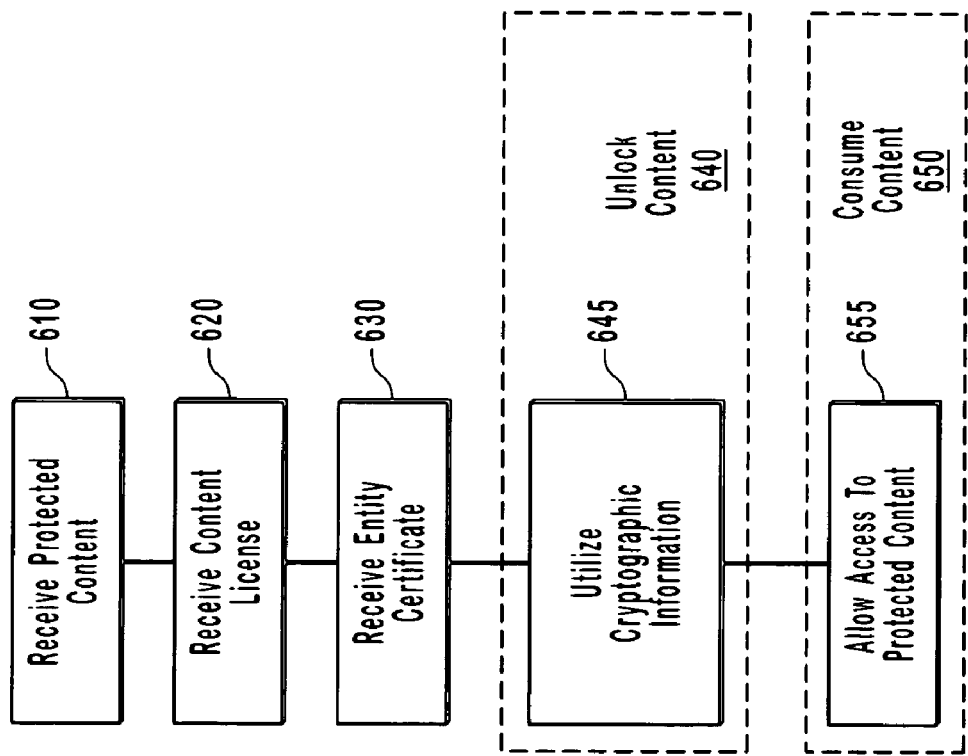
FIG. 6 shows example acts and steps for methods of enforcing digital rights within the confines of a content license by validating an entity certificate.

FIG. 6 illustrates example steps and acts used in a rights management system that protects content from being consumed by unauthorized devices. As previously mentioned, the present invention enforces digital rights within the confines of a content license by validating an entity certificate that includes personal credential information that an entity would be unwilling to publicly share. For example, exemplary methods and computer program products may include the act of receiving 610 protected content that is bound to a content license. Further, methods and computer program products may also include the act of receiving 620 the content license that provides a content encryption key used to unlock and consume the protected content. The content license includes one or more usage rights that define how and under what conditions the protected content can be consumed on a device.

Example embodiments further provide for the act of receiving 630 an entity certificate that includes personal credentials. The personal credentials are such that the entity is unwilling or uncomfortable to share them publicly, and provide private information, or information associated with a personal object that cannot consume the protected content, or both. The private information including one or more of a social security number, tax identification number, passport number, enterprise registration number, driver's license number, credit card information, an electronic serial number, digital signature, etc. As previously mentioned, the entity certificate may be supplied to the device or other trusted device by a watch, mobile device, smart card, etc. Accordingly, if the entity certificate is supplied by a mobile device or smart card, the information associated with the personal object could be information about the mobile device or the smart card.

A step for unlocking 640 protected content and validating the entity certificate may include the act of utilizing 645 cryptographic information within the entity certificate. Finally, a step for consuming 650 the protected content may include the act of allowing 655 the device access to the protected content upon validation of the entity certificate.

As previously mentioned, other example embodiments provide that the device, a trusted device or other proxy including the personal objects described herein, may validate the entity certificate. Other example embodiments provide that the trusted device or proxy device may validate the entity certificate by issuing a temporary sub-license that is bound to the device by a device identity within the sub-license and allows the device or a group of devices to consume the content in accordance with the usage rights defined in the original content license. Still other embodiments provide that the personal credential information is securely stored in an encrypted format, or is in the clear. Yet further embodiments provide that the entity certificate includes one or more pieces of information chosen from an identity of a trust authority that generated the entity certificate, a date for which the certificate was generated and a hash of the content license or a portion thereof. The one or more pieces of information may be encrypted, or in the clear. Other example embodiments provide that the entity certificate expires within a predetermined time period set by a content provider, or after the content certificate has been used a predetermined number of times. If such expiration occurs, or just prior to such expiration, a request may be automatically made to an authority that generated the entity certificate for renewal of the entity certificate.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, which can store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable communications medium. Thus, any such connection is properly termed a computer-readable communications medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
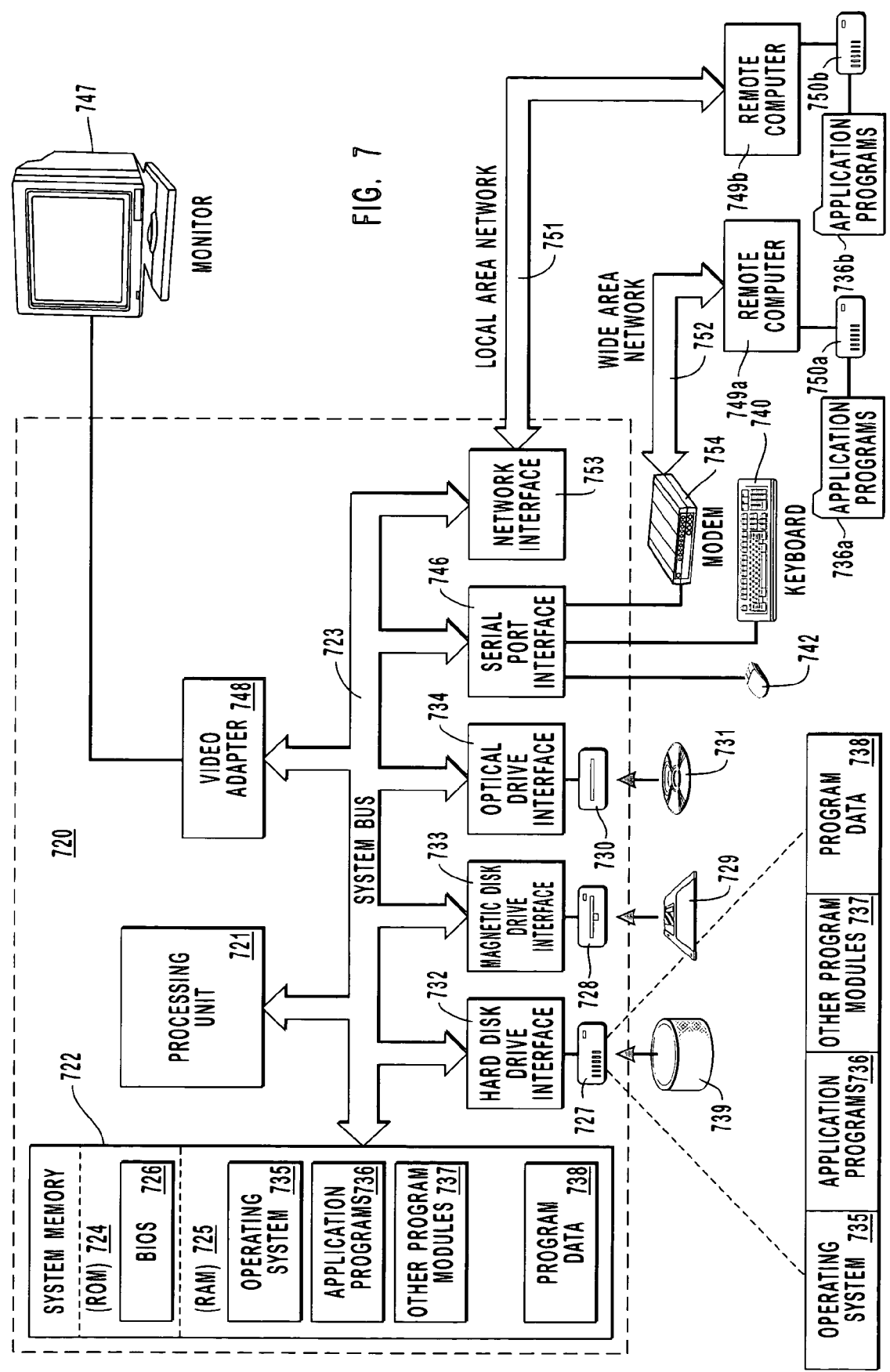
FIG. 7 illustrates an example system that provides a suitable operating environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 36, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a digital rights management (DRM) system which is designed to prevent protected content from being consumed by an entity in an unauthorized manner by providing a content license which defines how and under what conditions the protected content can be consumed on a digital processing device or system used by the entity, a method of authorizing a digital processing device for consumption of the protected content without requiring the content license to be tied to a particular device ID or to a domain ID for a given number of devices, so that a person desiring to consume the protected content may do so with greater freedom while still protecting against unauthorized consumption of the content, the method comprising:

a user authorizing creation by a trusted authority of an entity certificate that will be used to bind the content license to the entity certificate so that ultimately content protected under the content license is bound to the user as opposed to a particular device ID or a domain ID for a number of devices, the entity certificate including,
  an entity identifier (E_ID),
  cryptographic information used in accessing the protected content once it is downloaded to a selected digital processing system, and
  information representing personal credentials of the user which is either private as to the user, or which is associated with a personal object of the user where the object is one that cannot consume the protected content and which is substantially for the user's private use;
the user selecting a digital processing device for use in accessing and consuming the protected content, the protected content including a key identifier (K_ID);
receiving at the selected digital processing device the protected content that is to be consumed and the corresponding content license that:
  is bound to the entity certificate by including the E_ID of the entity certificate, and separate from the E_ID included in the entity certificate,
  is bound to the protected content by including the K_ID of the content,
  is bound to a group of devices by an included domain identifier (N_ID),
  is bound to a digital processing device by an included device identifier (D_ID),
  defines, within the license, the rights as to how and under what conditions the protected content can be consumed, and
  provides a content encryption key used to unlock the protected content so that it can be consumed;
determining, using the E_ID, whether an entity certificate has been created for the user, and when an entity certificate has been created for the user, validating the entity certificate with the content license received at the selected digital processing device, and only when an entity certificate has not been created for the user,
  determining, using the N_ID whether a domain certificate exists that includes domain credentials for a group of devices at least one of which includes the selected digital processing device, and only when a domain certificate does not exist that includes domain credentials for a group of devices at least one of which includes the selected digital processing device,
  determining, using the D_ID whether a device certificate exists for the selected digital processing device;
utilizing cryptographic information within the at least one of either a validated entity certificate, domain certificate or device certificate for unlocking the content encryption key provided by the content license; and
only then, allowing the selected digital processing device access to the protected content for consumption.

2. The method of claim 1, wherein the entity certificate is supplied to the selected digital processing device by one of a watch, a mobile device or a smart card.

3. The method of claim 1, wherein a trusted device utilizes the cryptographic information within the entity certificate for unlocking the content encryption key provided by the content license.

4. The method of claim 3, wherein the entity certificate is supplied to the trusted device by one of a watch, a mobile device or a smart card.

5. The method of claim 3, wherein a temporary sub-license is generated that is bound to either the selected digital processing device by a device identity or a selected group of digital processing devices by a domain identity within the sub-license, and wherein the sub-license allows the selected device or selected group of digital processing devices to consume the protected content in accordance with the usage rights defined in the content license.

6. The method of claim 3, wherein the selected digital processing device sends the content license and entity certificate to the trusted device, and wherein the trusted device sends an acknowledgment message to the device, which allows the selected device or a selected group of digital processing devices access to the content encryption key used to unlock and consume the protected content in accordance with the usage rights within the content license.

7. The method of claim 3, wherein the user provides the entity certificate and license to the trusted device, and the trusted device sends an acknowledgment message to the selected digital processing device, which allows the selected device or a selected group of digital processing devices access to the content encryption key used to unlock and consume the protected content in accordance with the usage fights within the content license.

8. The method of claim 3, wherein the trusted device also controls consumption commands for the protected content and sends them to the selected digital processing device.

9. The method of claim 1, wherein the entity certificate further includes one or more pieces of information chosen from an identity of a trusted authority that generated the entity certificate, a date for which the certificate was generated and a hash of the content license.

10. The method of claim 9, wherein the one or more pieces of information are encrypted.

11. The method of claim 1, wherein the entity certificate expires within a predetermined time period set by a content provider or after the entity certificate has been used a predetermined number of times, and wherein a request is automatically made to an authority that generated the entity certificate for renewal of the entity certificate.

12. In a digital fights management (DRM) system which is designed to prevent protected content from being consumed by an entity in an unauthorized manner by providing a content license which defines how and under what conditions the protected content can be consumed on a digital processing device or system used by the entity, a computer program product comprising a computer-readable storage medium which contains computer-executable instructions for implementing a method of authorizing a digital processing device for consumption of the protected content without requiring the content license to be tied to a particular device ID or to a domain ID for a given number of devices, so that a person desiring to consume the protected content may do so with greater freedom while still protecting against unauthorized consumption of the content, the method comprising:
  a user authorizing creation by a trusted authority of an entity certificate that will be used to bind the content license to the entity certificate so that ultimately content protected under the content license is bound to the user as opposed to a particular device ID or a domain ID for a number of devices, the entity certificate including,
    an entity identifier (E_ID),
    cryptographic information used in accessing the protected content once it is downloaded to a selected digital processing system, and
    information representing personal credentials of the user which is either private as to the user, or which is associated with a personal object of the user where the object is one that cannot consume the protected content and which is substantially for the user's private use;

the user selecting a digital processing device for use in accessing and consuming the protected content, the protected content including a key identifier (K_ID);

receiving at the selected digital processing device the protected content that is to be consumed and the corresponding content license that:
- is bound to the entity certificate by including the E_ID of the entity certificate, and separate from the E_ID included in the entity certificate,
- is bound to the protected content by including the K_ID of the content,
- is bound to a group of devices by an included domain identifier (N_ID),
- is bound to a digital processing device by an included device identifier (D_ID),
- defines, within the license, the rights as to how and under what conditions the protected content can be consumed, and
- provides a content encryption key used to unlock the protected content so that it can be consumed;

determining, using the E_ID, whether an entity certificate has been created for the user, and when an entity certificate has been created for the user, validating the entity certificate with the content license received at the selected digital processing device, and only when an entity certificate has not been created for the user, determining, using the N_ID, whether a domain certificate exists that includes domain credentials for a group of devices at least one of which includes the selected digital processing device, and only when a domain certificate does not exist that includes domain credentials for a group of devices at least one of which includes the selected digital processing device, determining, using the D_ID, whether a device certificate exists for the selected digital processing device;

utilizing cryptographic information within the at least one of either a validated entity certificate, domain certificate or device certificate for unlocking the content encryption key provided by the content license; and only then, allowing the selected digital processing device access to the protected content for consumption.

* * * * *